C. J. OHLSSON.
GRIP TREAD FOR VEHICLE TIRES.
APPLICATION FILED MAY 12, 1910.
991,013.
Patented May 2, 1911.
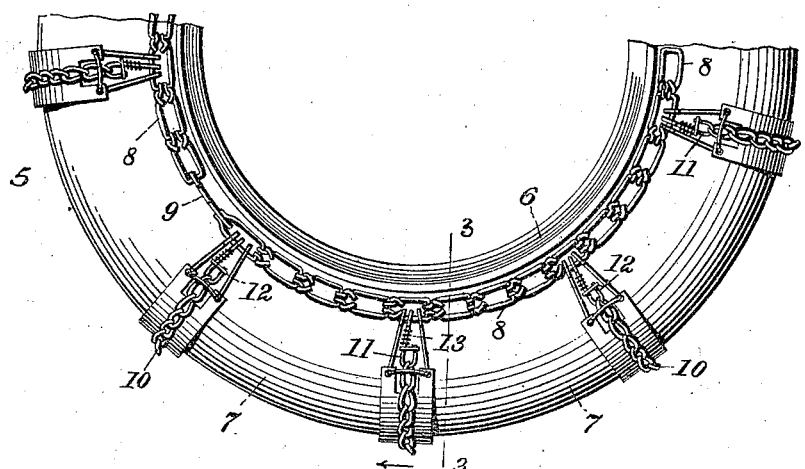
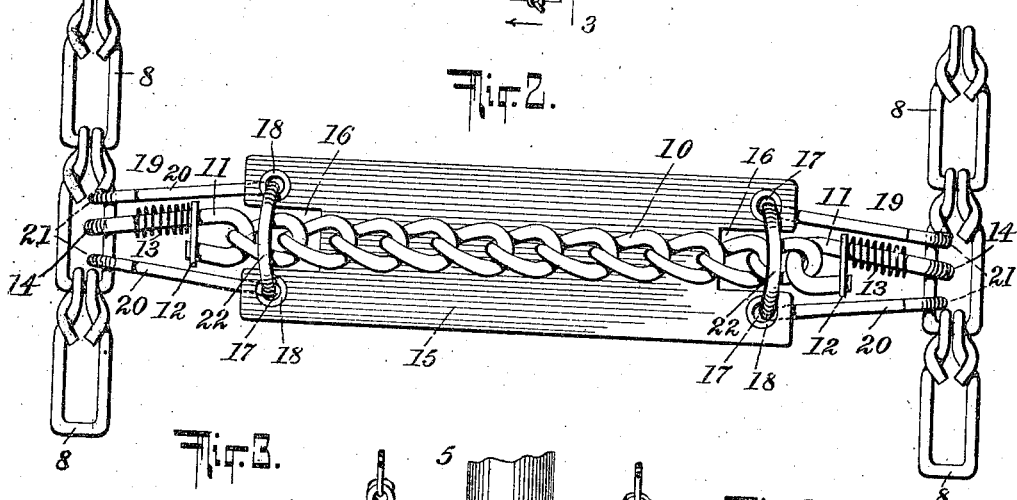
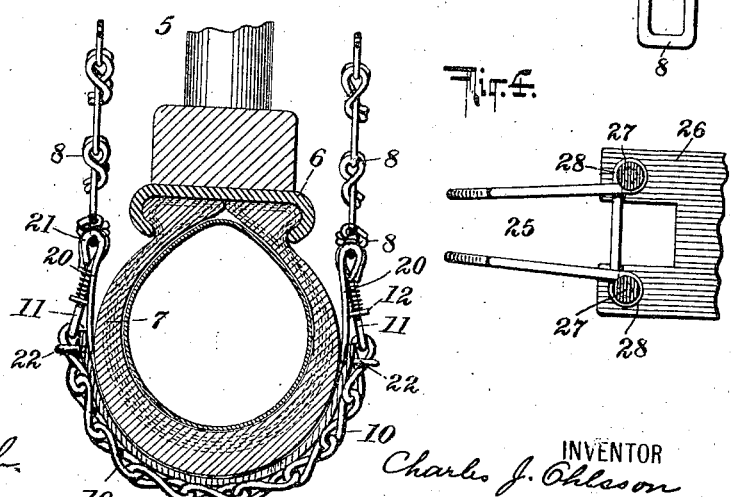
INVENTOR
Charles J. Ohlsson
BY
Conrad A. Dieterich
his ATTORNEY
WITNESSES:
Edwin H. Dieterich
Donald Campbell

UNITED STATES PATENT OFFICE.

CHARLES J. OHLSSON, OF NEW YORK, N. Y.

GRIP-TREAD FOR VEHICLE-TIRES.

991,013.  Specification of Letters Patent.  Patented May 2, 1911.

Application filed May 12, 1910. Serial No. 560,785.

*To all whom it may concern:*

Be it known that I, CHARLES J. OHLSSON, of the city of New York, borough of Brooklyn, Kings county, in the State of New York, have invented certain new and useful Improvements in Grip-Treads for Vehicle-Tires, of which the following is a full, clear, and exact specification.

My invention relates to improvements in means for increasing the tractive properties of the vehicle wheel, and the same has for its object more particularly to provide a grip tread for resilient tired wheels used in self-propelled vehicles.

Further said invention has for its object to provide a grip tread which is so constructed that the same will not injure the tire upon which it is used.

Further said invention has for its object to provide a grip tread which may be readily attached to, or detached from a vehicle tire, and whereof any one or more of the several gripping members may be readily removed when broken, and replaced by a new one.

Further said invention has for its object to provide a grip tread which is so constructed that if any one of the gripping members or transverse chains should become worn through and break, the ends or broken portions will be held firmly in place to prevent the same striking the parts of the vehicle adjacent to the periphery of the wheel.

To the attainment of the aforesaid objects and ends my invention consists in the novel details of construction and in the combination, connection and arrangement of parts hereinafter more fully described, and then pointed out in the claims.

In the accompanying drawings forming part of this specification, wherein like numerals of reference indicate like parts, Figure 1 is a side view showing a portion of a vehicle wheel and tire, and a grip tread, constructed according to, and embodying my said invention, applied thereto; Fig. 2 is an enlarged detail face view showing portions of the side chains, and one of the gripping members or chains with its protecting means secured thereto; Fig. 3 is an enlarged transverse section taken on the line 3—3 of Fig. 1 looking in the direction of the arrow, and Fig. 4 is a detail face view showing a modified form of securing means for a protecting section.

In said drawings 5 designates a vehicle wheel of usual construction, 6 the rim thereof, and 7 a pneumatic tire secured upon the outer side of the rim.

The grip tread shown in position upon said wheel comprises a pair of parallel attaching members or side chains 8, 8 each provided at one of its ends with a hook 9 adapted to lock into the link at the opposite end of the chain. The side chains 8, 8 are of such length that when arranged upon a wheel, and their respective ends secured together they will form circular members of smaller diameter than the diameter of the tire.

Between the side chains 8, 8 are arranged at suitable intervals, a plurality of transverse gripping members or short chains 10, 10 which are secured at their opposite ends to said side chains by hooks 11, 11. The outer ends of said hooks are secured to links of the side chains, while the inner or hook ends of said hooks engage the opposite ends of said transverse gripping members or chains 10, 10 and are locked in engagement therewith by keepers 12, 12. Each of said keepers has one of its ends slidably disposed upon the body portion of the hook, and its other end provided with an aperture to receive the end of the hook proper. The keepers 12, 12 are maintained in position upon said hooks with their ends normally engaging the ends of the hooks proper, by coil springs 13, 13, disposed upon the body portions of said hooks intermediate the eyes 14, 14 at the outer ends thereof, and the keepers 12, 12 arranged upon said body portions. Below said transverse chain or gripping member 10 is disposed a protecting section 15, which may be made of any suitable material or substance, but preferably of leather, and somewhat shorter in length than the transverse gripping member or chain 10 thereon. The protecting member is further preferably provided at its opposite ends with recesses 16, 16 for the chain 10, and in said recessed ends are apertures 17, 17 having eyelets 18, 18 secured therein.

19, 19 denote shackles; each comprising a pair of longitudinal members 20, 20, provided at their outer ends with eyes 21, 21 secured to one of the links of the side chains 8, and having their inner ends extending through the eyelets 18, 18 in the ends of said protecting section 15. The inner ends of said longitudinal members 20, 20 are united by curved transverse members 22, 22 which serve to press or hold the gripping chain 10 adjacent to its opposite ends against the surface of the tire 7.

It will be noted that when the grip tread is secured in position upon a wheel, the side chains 8, 8, serve to maintain the transverse chains 10, 10, and their protecting sections 15, 15 under tension upon the tire, and that if one of said transverse chains should wear out and break near its middle, the broken ends will be drawn apart by the action of the side chains 8, 8. The broken ends will thereupon be held firmly in position and against the surface of the tire 7 by the transverse members 22, 22 of the shackles 19, 19, which continue to be maintained under tension of the side chains 8, 8, by reason of their being secured together by the protecting section 15. By this means the broken ends of the chains are held firmly in place, and prevented from striking the parts of the vehicle adjacent to the periphery of the wheel, as the latter revolves. To replace a broken chain it may become necessary to push back the keepers 12, 12 of the hooks 11, 11, and remove the broken chain ends and then insert the end links of a new chain.

In the modification illustrated at Fig. 4, the shackle 25 is secured at its inner end to the separated end of the protecting section 26, by means of rivets 27, 27, secured to said protecting section, and passing through eyes 28, 28, formed at the inner end of the shackle.

In this application I have made no claim for the particular construction of hook member shown and described, as the same forms the subject matter of a separate application filed by me on December 22, 1910, Serial No. 598,774.

Having thus described my said invention, what I claim and desire to secure by Letters Patent is:

1. A grip tread for vehicle tires comprising a pair of attaching members, a plurality of gripping members, secured thereto, protecting means for said gripping members, and means, embracing said gripping members, and serving to secure said protecting members to said attaching members, substantially as specified.

2. A grip tread for vehicle tires comprising a pair of attaching members, a plurality of transverse gripping members, protecting means disposed beneath said gripping members, and means, embracing said gripping members, for securing said protecting means to said attaching members, substantially as specified.

3. A grip tread for vehicle tires comprising a pair of parallel attaching members, a plurality of transverse gripping members secured thereto, protecting means for each of said gripping members, and means, embracing said gripping members, for securing said protecting means to said attaching members, substantially as specified.

4. A grip tread for vehicle tires comprising a pair of parallel flexible attaching members, a plurality of transverse gripping members secured thereto, separate protecting means for each of said gripping members, and means, engaging the ends of said gripping members, for securing said protecting means to said attaching members, substantially as specified.

5. A grip tread for vehicle tires comprising a pair of parallel, flexible attaching members, a plurality of transverse flexible gripping members, means for securing said gripping members to said attaching members, flexible protecting members for each of said gripping members, and means, embracing said gripping members adjacent to their opposite ends, for securing said protecting members to said attaching members, substantially as specified.

6. A grip tread for vehicle tires comprising a pair of parallel flexible attaching members, a plurality of transverse gripping members arranged at intervals between attaching members, means for securing the ends of said gripping members to said attaching members, flexible protecting sections disposed beneath said gripping members, means, embracing said gripping members adjacent to their opposite ends, for securing the ends of said protecting sections to said attaching members, substantially as specified.

7. A grip tread for vehicle tires comprising a pair of parallel attaching chains, a plurality of short chain sections arranged at intervals between said attaching chains, hooks for securing the ends of said short chain sections to said attaching chains, means for locking the ends of said short chain sections within said hooks, flat, flexible protecting sections disposed beneath said short chain sections, and shackles securing the ends of said flexible protecting sections to said attaching chains and embracing the ends of said short chain sections, substantially as specified.

8. A grip tread for vehicle tires comprising a pair of parallel attaching chains, a plurality of short chain sections arranged transversely between said attaching chains, hook members for securing said short chain sections to said attaching chains, keepers for retaining the ends of said chains within said hooks, flexible protecting sections disposed beneath said short chain sections, and shackles for securing the ends of said protecting sections to said attaching chains, each of said shackles comprising a pair of longitudinal members secured at their outer ends to said attaching chains, and at their inner ends secured to said flexible protecting sections, and a transverse member connecting the inner ends of said shackle and embracing the end of one of said short chain sections, substantially as specified.

9. A grip tread for vehicle tires comprising a pair of side chains, means for securing the ends of each of said chains together, a plurality of short chain sections arranged intermediate said side chains, hooks for securing said short chain sections to said side chains, spring-pressed keepers on said hooks for retaining the ends of said short chain sections within said hooks, flexible protecting sections, having separated ends disposed beneath said short chain sections, and shackles for securing said protecting sections to said side chains, said shackles each comprising a pair of longitudinal members secured at their outer ends to one of said side chains, and secured at their inner ends to the separate ends of one of said protecting sections, at each side of the hook adjacent to said end, and a transverse member embracing the corresponding end of one of said short chain sections, substantially as specified.

Signed at the city of New York, in the county and State of New York, the 21st day of April, 1910.

CHARLES J. OHLSSON.

Witnesses:
CONRAD A. DIETERICH,
LESTER C. TAYLOR.